US012620521B2

(12) United States Patent
Bühlmaier et al.

(10) Patent No.: US 12,620,521 B2
(45) Date of Patent: May 5, 2026

(54) COIL AND METHOD FOR PRODUCING A COIL

(71) Applicant: TDK Electronics AG, Munich (DE)

(72) Inventors: Stephan Bühlmaier, Langenau (DE); Felipe Jerez Galdeano, Thalfingen-Elchingen (DE); Joachim Nassal, Heidenheim (DE); Anneliese Drespling, Heidenheim (DE); Gerhard Proks, Steinheim (DE); Herbert Lux, Heidenheim (DE)

(73) Assignee: TDK Electronics AG, Munich (DE)

( * ) Notice: Subject to any disclaimer, the term of this patent is extended or adjusted under 35 U.S.C. 154(b) by 684 days.

(21) Appl. No.: 17/425,565

(22) PCT Filed: Feb. 14, 2020

(86) PCT No.: PCT/EP2020/053963
§ 371 (c)(1),
(2) Date: Jul. 23, 2021

(87) PCT Pub. No.: WO2020/165438
PCT Pub. Date: Aug. 20, 2020

(65) Prior Publication Data

US 2022/0093324 A1 Mar. 24, 2022

(30) Foreign Application Priority Data

Feb. 15, 2019 (DE) ........................ 102019103895.2

(51) Int. Cl.
*H01F 27/29* (2006.01)
*H01F 27/02* (2006.01)
(Continued)

(52) U.S. Cl.
CPC .......... *H01F 27/29* (2013.01); *H01F 27/022* (2013.01); *H01F 27/2828* (2013.01);
(Continued)

(58) Field of Classification Search
CPC .... H01F 27/29; H01F 27/022; H01F 27/2828; H01F 2017/048; H01F 27/292; H01F 27/2847; H01F 27/28
See application file for complete search history.

(56) References Cited

U.S. PATENT DOCUMENTS 4,833,437 A * 5/1989 Williamson ............ H01F 37/00 336/83
5,428,337 A * 6/1995 Vinclarelli ............ H01F 41/071 336/83
(Continued)

FOREIGN PATENT DOCUMENTS

CN 88102828 A 11/1988
CN 101197538 A 6/2008
(Continued)

OTHER PUBLICATIONS

Wang, H., "Structure Design of Ignition Coil", Automotive Electrical Appliance, Design Research, Issue 9, May 2019, 29 pages.

*Primary Examiner* — Mang Tin Bik Lian
(74) *Attorney, Agent, or Firm* — Slater Matsil, LLP

(57) ABSTRACT

In an embodiment a coil includes a tube comprising a tube wall composed of an electrically conductive material, wherein the tube wall has an inductive portion in which a gap is arranged that shapes the tube wall so the tube wall forms a helix in the inductive portion, and wherein the tube wall has two contact portions, each contact portion forming an electrical terminal.

27 Claims, 5 Drawing Sheets

(51) Int. Cl.
*H01F 27/28* (2006.01)
*H01F 41/00* (2006.01)
*H01F 41/064* (2016.01)
*H01F 41/076* (2016.01)

(52) U.S. Cl.
CPC ......... *H01F 41/005* (2013.01); *H01F 41/064* (2016.01); *H01F 41/076* (2016.01); *H01F 27/2804* (2013.01)

(56) References Cited

U.S. PATENT DOCUMENTS

| | | | | |
|---|---|---|---|---|
| 6,535,093 | B1 | 3/2003 | Murata et al. | |
| 6,718,625 | B2 | 4/2004 | Ito et al. | |
| 7,489,222 | B2 | 2/2009 | Edo et al. | |
| 7,598,839 | B1 * | 10/2009 | Wedley ................... | H01F 27/30 336/212 |
| 7,834,733 | B2 | 11/2010 | Feist et al. | |
| 8,239,041 | B2 * | 8/2012 | Kondabatni ......... | H03H 1/0007 607/116 |
| 9,208,933 | B2 | 12/2015 | Francoeur et al. | |
| 9,431,722 | B2 | 8/2016 | Lerchenmueller et al. | |
| 9,468,750 | B2 * | 10/2016 | Kondabatni ............. | A61N 1/05 |
| 10,012,608 | B2 | 7/2018 | Nagel et al. | |
| 10,156,533 | B2 | 12/2018 | Nagel et al. | |
| 10,170,239 | B2 | 1/2019 | Steinhilber | |
| 10,699,836 | B2 * | 6/2020 | Schekulin ............... | H01F 41/00 |
| 10,923,322 | B2 | 2/2021 | Lopez et al. | |
| 2002/0013994 | A1 | 2/2002 | Ahn | |
| 2002/0020052 | A1 * | 2/2002 | Ito ......................... | H01F 17/045 29/606 |
| 2005/0046534 | A1 * | 3/2005 | Gilmartin ............. | H01F 17/043 336/83 |
| 2005/0122200 | A1 * | 6/2005 | Shafer ................. | H01F 27/2847 336/200 |
| 2005/0174208 | A1 * | 8/2005 | Sato .......................... | H01F 5/00 336/200 |
| 2009/0195341 | A1 * | 8/2009 | Rokuka ................ | H01Q 1/1278 336/65 |
| 2009/0278650 | A1 * | 11/2009 | Shieh .................... | H01F 27/027 336/200 |
| 2010/0164665 | A1 * | 7/2010 | Sevakivi ................... | H01F 5/00 336/61 |
| 2010/0201671 | A1 | 8/2010 | Bowman et al. | |
| 2010/0271161 | A1 | 10/2010 | Yan et al. | |
| 2010/0277267 | A1 | 11/2010 | Bogert et al. | |
| 2010/0301983 | A1 * | 12/2010 | Furuta ..................... | H01F 17/02 336/228 |
| 2011/0018668 | A1 * | 1/2011 | Imbimbo .............. | H01F 21/005 29/606 |
| 2014/0176278 | A1 * | 6/2014 | Lee ......................... | H01F 41/10 29/606 |
| 2016/0181006 | A1 * | 6/2016 | Yu ......................... | H01F 27/292 336/90 |
| 2018/0226184 | A1 | 8/2018 | Kudo et al. | |
| 2018/0274504 | A1 | 9/2018 | Hayashi | |
| 2018/0366301 | A1 * | 12/2018 | Lopez ...................... | H03H 7/38 |
| 2020/0234860 | A1 * | 7/2020 | Kusuda ..................... | H01F 5/00 |
| 2021/0020352 | A1 * | 1/2021 | Okano .................. | H01F 27/303 |

FOREIGN PATENT DOCUMENTS

| | | | |
|---|---|---|---|
| CN | 201340768 | Y | 11/2009 |
| CN | 101620918 | A | 1/2010 |
| CN | 101878498 | A | 11/2010 |
| CN | 102543389 | A | 7/2012 |
| CN | 102812528 | A | 12/2012 |
| CN | 202771893 | U | 3/2013 |
| CN | 104823326 | A | 8/2015 |
| CN | 105372503 | A | 3/2016 |
| CN | 105372504 | A | 3/2016 |
| CN | 106057464 | A | 10/2016 |
| CN | 108305738 | A | 7/2018 |
| DE | 102005010342 | A1 | 9/2006 |
| DE | 102011082045 | A1 | 3/2013 |
| DE | 102012011554 | A1 | 12/2013 |
| JP | S60144921 | A | 7/1985 |
| JP | H01266705 | A | 10/1989 |
| JP | H1197270 | A | 4/1999 |
| JP | H11126717 | A | 5/1999 |
| JP | 2001102220 | A | 4/2001 |
| JP | 2004165418 | A | 6/2004 |
| JP | 2005197388 | A | 7/2005 |
| JP | 2006049931 | A | 2/2006 |
| JP | 2012526384 | A | 10/2012 |
| JP | 2013222895 | A | 10/2013 |
| JP | 2016067088 | A | 4/2016 |
| KR | 20170046008 | A | 4/2017 |
| KR | 20180136379 | A | 12/2018 |
| TW | 412760 | B | 11/2000 |
| WO | 2018159333 | A1 | 10/2018 |

* cited by examiner

COIL AND METHOD FOR PRODUCING A COIL

This patent application is a national phase filing under section 371 of PCT/EP2020/053963, filed Feb. 14, 2020, which claims the priority of German patent application 102019103895.2, filed Feb. 15, 2019, each of which is incorporated herein by reference in its entirety.

TECHNICAL FIELD

The invention relates to a coil, having a tube composed of conductive material, and to a method for producing the coil.

BACKGROUND

In the context of the miniaturization of electrical circuits, there is great interest in the provision of small inductive components that have low power loss, high current carrying capacity and a reliable, long service life.

In the case of wire coils, in particular, a weak point may be the connection of the wire to a contact element that is required for external contacting. The connection, which is usually realized by means of welded joints, or soldered joints, may have an at least slightly increased resistance due to the use of an alloy that contains copper, tin or nickel, or due to contamination with oxygen. If the contacting is not realized properly, the resistance may also be considerably higher. This may result in a high transition resistance, which causes a high power loss. This may also result in an increased thermal load at this point, which in harmless cases may result in a failure of the coil or, in serious cases, in a fire.

SUMMARY

Embodiments provide a coil that has improved characteristics. Further embodiments provide a manufacturing method for a coil.

There is proposed a coil, which has a tube comprising a tube wall composed of an electrically conductive material, wherein the tube has an inductive portion in which there is arranged, in the tube wall, a gap that shapes the tube wall in the inductive portion to form a helix, and wherein the tube has two contact portions in each of which the tube wall is shaped to form an electrical terminal.

A tube may be described as an elongate, hollow body having an opening that extends from a first end of the body, through the entirety of the body, to a second end that is opposite to the first end. The tube may be symmetrical relative to its central axis, the central axis extending from the mid-point of a base area at the first end to the mid-point of a base area at the second end. In one embodiment, the tube may have a circular, oval or rectangular cross-section. Other cross-sections are also possible.

A helix may be described as a helical structure. In particular, the helix may realize turns of the coil.

The tube may have, in particular, a helical gap in the tube wall, whereby the turns of the coil are formed from the tube. The tube is composed of a conductive material. The term conductive material refers to materials having a conductivity of above $10^4$ S/m, but in particular materials having a conductivity of above $10^5$ S/m or above $10^6$ S/m. Materials having a very high conductivity, for example metals such as copper, aluminum, silver or gold may be suitable for this purpose. Industrial steels, such as carbon steel, high-grade steel, alloy steel or tool steel, may also be suitable as a starting material for the tube.

The tube comprises the inductive portion and at least one contact portion. Due to the helix formed by the gap, the inductive portion may form an inductance. The inductive portion and the contact portion are realized as a single piece from a material of the tube wall. Thus, no connection means such as, for instance, solder, are required for connecting the inductive portion to the contact portion. Rather, the inductive portion and the contact portion can be formed by appropriate structuring of the tube wall while remaining connected to each other by the tube material.

The coil has the advantage that no internal connection points are required for connecting an inductor to a terminal. Rather, the inductive region and the contact region may be realized integrally. The coil has a lower total resistance than a coil that requires internal connection points for connecting an inductor to a terminal. Moreover, the absence of internal contactings also eliminates the thermal as well as mechanical stress that would otherwise occur at the possible internal contactings, thereby reducing the fault susceptibility of the coil.

For this purpose, the tube does not have to be round in cross-section, but may be, for example, oval, square, rectangular, polygonal, square with rounded corners, rectangular with rounded corners or polygonal with rounded corners. A square cross-section offers the advantage of optimal utilization of an available installation space for a given height, or width.

Depending on the application for which the coil is intended, the base area of the tube may be planar, i.e. the extents of the tube that span the base area may be large compared to the extent over a height, and the height may be small. Or the tube may have a small base area, but a considerable height. If the coil is fitted, for example, on a printed circuit board that is mounted in a narrow housing, a flat and planar shape may be advantageous. If, on the other hand, little space can be provided on the printed circuit board itself, a tubular shape, having a small base area, but with a significant height, may be advantageous.

The coil may also have a magnetic core. The use of, for example, a ferromagnetic core can provide a higher magnetic flux density in the coil and an increased inductance of the coil. The metals nickel zinc, manganese zinc and cobalt, as well as other alloys, may be suitable materials for the core. The core in this case is not limited merely to cores arranged solely within the interior of the coil, but also includes cores that realize the core integrally as part of a modular coil housing. The embodiment of a coil having a modular coil housing may improve the electromagnetic compatibility of the coil. If, for example, an EP core is used as a housing, the electromagnetic shielding by the housing can be improved, in particular in the case of high frequency applications, and the electromagnetic compatibility thereby increased.

Furthermore, the tube may be embedded in a plastic in order to protect the tube, mainly against mechanical, but also against temperature influences and chemical influences. Suitable plastics are epoxy resin, phenyl resin but also silicones. Since the tube is embedded in a plastic, the coil component is more suitable for assembly by means of an automatic assembly machine, for example in a pick-and-place process.

Powder having magnetic properties, such as iron powder, or magnetic nanoparticles, may be mixed into the plastic. The addition of magnetic particles to the plastic can increase the inductance of the coil and improve the electrical properties. The proportion of magnetic particles in the plastic can be used to adjust the inductance. The coil may additionally have a magnetic core, even when embedded in a plastic, irrespective of whether the latter contains a proportion of magnetic powder, in order to increase the inductance of the coil. As a result of the coil being embedded in a plastic, in particular in a plastic that contains a proportion of a powder having magnetic properties, the electromagnetic shielding of the component can be improved, in particular also in the case of high-frequency applications, and the electromagnetic compatibility can be increased.

Further, the coil may have an outer diameter of 0.2 to 50 mm. Preferably, the outer diameter of the coil may be in the range of between 0.5 and 20 mm. This size is particularly suitable for providing coils that are suitable for applications on a printed circuit board. The outer diameter should not be smaller than 0.2 mm, preferably not smaller than 0.5 mm, as otherwise a coil would be produced that is so small that automatic parts handling would entail considerable technical difficulties. The outer diameter should not be larger than 50 mm, preferably not larger than 20 mm, as otherwise the production of the coil from a tube appears uneconomic.

The contact portion may have a flat surface that forms a solderable terminal. Accordingly, the coil may be designed, in particular, to be soldered onto the printed conductor of, for example, a printed circuit board.

A further aspect of the present application relates to a module comprising at least two coils. The coils may be, in particular, the coils described above.

The at least two coils are arranged in a common housing. The housing may be formed by a plastic in which both coils are embedded. The two coils in this case may be arranged spatially parallel to each other.

The coils are preferably arranged such that the coils can be electrically contacted individually and are not interconnected in the module. In an alternative embodiment, the coils may be electrically interconnected in parallel or in series, in order to impart a desired inductance to the module as a whole. In this way, it is possible to assemble a module from a plurality of coils, such that the module as a whole has a higher or lower inductance than the individual coil.

The use of the module can shorten the process of placing a multiplicity of coils on a printed circuit board, and thus result in a reduced cycle time in a production process. Since the module, rather than a multiplicity of individual coils, is mounted, only one module, rather than a plurality of individual coils, needs to be positioned on the printed circuit board in the process of mounting the coils, for example by means of an automatic pick-and-place machine. The module can thus simplify a subsequent process, in which the module is installed.

Moreover, space is saved by multiple coils being arranged within a module, compared to a plurality of individual coils being arranged adjacently. In the case of applications in which an available space is very restricted, for example in the case of a printed circuit board for a mobile device, e.g. a smartphone, this space saving can be a significant advantage. In addition, housing material can be saved by use of the module instead of individually embedded coils.

Further embodiments relate to a method for producing a coil. The coil may be, in particular, the coil described above.

The method comprises the steps:

a. providing a tube comprising a tube wall composed of an electrically conductive material, and
b. creating a gap in an inductive portion of the tube, wherein the gap shapes the tube wall in the inductive portion to form a helix, and shaping at least two portions of the tube to form contact portions.

The inductance of the inductive portion in this case can be achieved only by creation of the gap. The gap may be a cut gap that is created by means of a laser. The shape of the contact portion may likewise be created by means of a laser, in particular in a laser process with the creation of the gap.

A laser process is suitable for creating the gap in the inductive portions, but also for creating a recess in the contact portions of the tube. The laser process has the advantage of being flexible in use, and fast. Moreover, the laser process has the advantage of not generating any mechanical stress, as it works contactlessly and leaves few residues. Other alternatives for creating the gap may be, for example, a milling process, a sawing process or water-jet cutting.

The above-mentioned step b. may have a further sub-step, wherein a recess is formed in the contact portion of the tube, in that a region of the tube wall is removed. The recess in the contact portion of the tube and the gap in the inductive region may be created jointly in a single method step. Accordingly, the entire step b may be created in a single process step, for example by means of laser cutting.

In a further sub-step of step b., a region of the tube wall that was not removed in the first sub-step may be planarized. In this case, the region may be shaped to form a flat electrical terminal that can be soldered onto a printed conductor, for example of a printed circuit board. The planarization may be effected by the application of pressure to the desired location, for example by means of a punch.

In addition, in step b., a coil string may first be created in that a plurality of inductive portions are created along the tube, in each of which there is created a gap that shapes the tube wall in the respective inductive portion to form a helix, and between two inductive portions in each case there is shaped a contact portion that, following singulation of the coil string, forms an electrical terminal. Such a coil string enables the handling of the coils in the production process to be optimized. Thus, a plurality of coils can be handled simultaneously, which in turn can result in a reduction in production cycle time. In addition, material can be saved by the creation of a plurality of inductive portions in one tube.

In an additional sub-step, the coil has an EP core. The inductance of the coil and the electromagnetic compatibility of the coil can thus be increased.

A plurality of coils, or coil strings, may be embedded in plastic, and thus form a package. The coils or coil strings may already have a magnetic core at this point. It is advantageous in this case to arrange the coil strings parallel to each other before embedding. Embedding a plurality of coil strings at the same time, rather than individually, enables the production process can be accelerated. The plastic protects the coils from mechanical influences, as well as from temperature influences and chemical influences. Powder having magnetic properties, or magnetic nanoparticles, may also be mixed into the plastic. The addition of magnetic particles to the plastic enables the inductance of the coil to be increased, and also to be adjusted on the basis of the proportion of magnetic particles in the plastic.

It may be advantageous to arrange magnetic cores in the coil strings or the coils. This can increase the inductance of the coils, or coil strings. Moreover, arranging the cores in the coil strings before embedding in a plastic makes it possible to produce coils, having a magnetic core, which are embedded in a plastic that may also have magnetic components. This can increase the inductance and electromagnetic compatibility of the coils.

Following the embedding of a plurality of parallel coil strings in a package, the coils may be singulated transversely and parallel with respect to the central axis of the coil strings. It is advantageous in this case for the separation line to be routed through the contact portions of the coils. The package is singulated into individual coils. It is possible to singulate the package first transversely and then parallelwise, as well as to singulate the package first parallelwise and then transversely.

A further aspect relates to a method for producing a module. In this case the package, which has a plurality of coil strings arranged in parallel, may be singulated transversely with respect to the central axis of the strings. There is no singulation into individual coils parallel to the axis.

The module has at least two coils in a common housing, wherein each of the coils has a tube comprising a tube wall composed of an electrically conductive material, wherein the tube has an inductive portion in which there is arranged, in the tube wall, a gap that shapes the tube wall in the inductive portion to form a helix, and wherein the tube has a contact portion in which the tube wall is shaped to form an electrical terminal. The method for producing the module comprises the following steps:

creating at least two coil strings, in that there are created, along each of the tubes, a plurality of inductive portions in each of which there is created a gap that shapes the tube wall in the respective inductive portion to form a helix, and wherein between two inductive portions in each case there is shaped a contact portion that, following singulation of the coil string, in each case forms an electrical terminal to the two adjacent inductive portions, arranging the coil strings in parallel, embedding the coil strings in a plastic, which forms the housing, and singulating the coil strings connected by the plastic, along separation lines that run transverse to a central axis of the coil strings to form the module.

BRIEF DESCRIPTION OF THE DRAWINGS

The invention is described in greater detail in the following on the basis of schematic representations of exemplary embodiments.

In the figures, elements that are the same, similar or visually the same are denoted by the same references. The figures, and the proportions in the figures, are not true to scale.

DETAILED DESCRIPTION OF ILLUSTRATIVE EMBODIMENTS

Figure 1A:
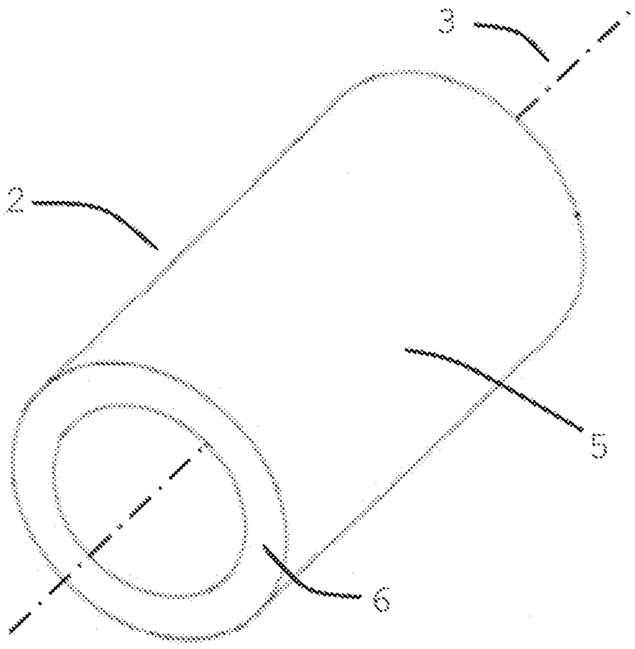
FIG. 1*a* shows a three-dimensional representation of a possible embodiment of a tube.
Figure 1B:
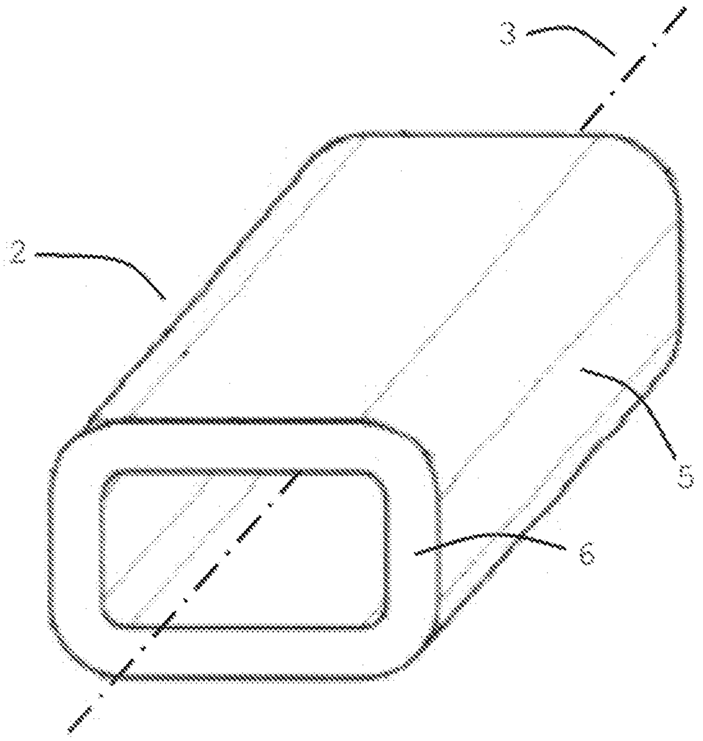
FIG. 1*b* shows a three-dimensional representation of a possible second embodiment of a tube.

Shown in FIGS. 1*a* and 1*b* is a tube 2 having, respectively, a round and a rounded square cross-sectional area. A tube 2 is an elongate hollow body, having an opening extending from a first end of the body, through the entire body, to a second end that is opposite to the first end. The tube 2 may be symmetrical relative to its central axis 3, the central axis 3 extending from the mid-point of the base area at the first end to the mid-point of the base area of the second end. In one embodiment, the tube 2 may have a circular, oval, rectangular or polygonal cross-sectional area. Other cross-sections are also possible.

The tube 2 may have an outer diameter of 0.2 to 50 mm. Preferably, the outer diameter of the tube 2 may be in the region of between 0.5 and 20 mm. This size is particularly suitable for producing coils that are suitable for applications on a printed circuit board. The tube wall 6, the thickness of which is determined by the distance between the inner radius to the outer radius of the tube 2, can vary greatly depending on the tube 2 used, although a thickness of less than 1 mm can be advantageous for machining. The circumferential surface 5 of the tube 2 extends along the outer radius, in the direction of the central axis 3. The tube 2 is composed of a primarily electrically conductive material.

The tube 2 constitutes a starting material that is used in the manufacture of a coil. The method for manufacturing the coil is explained with reference to FIGS. 1 to 3, which show intermediate products in the production of the coil. FIG. 4 and FIGS. 5, 6, 8 and 9 show possible embodiments of the coil 1.

Figure 2:
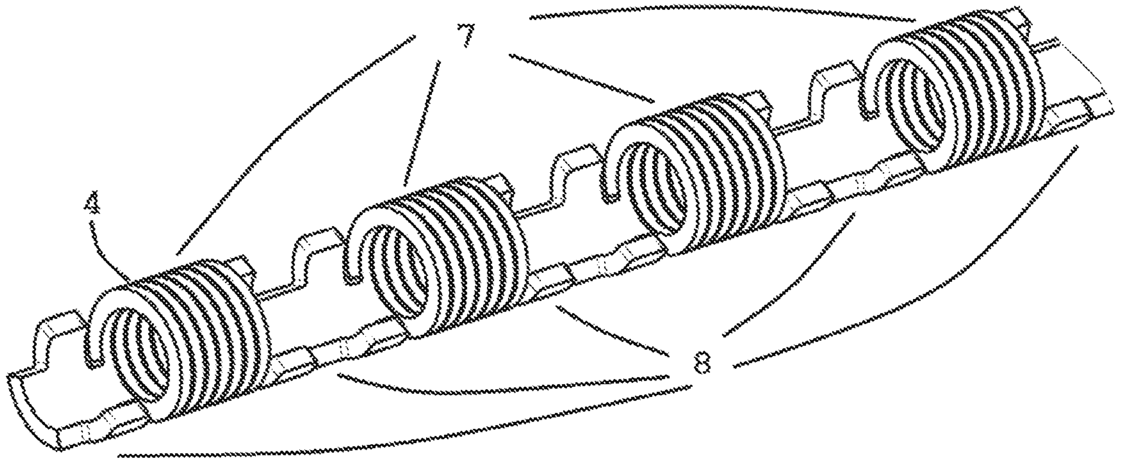
FIG. 2 shows a three-dimensional representation of a coil string.

In the course of the production process, the tube 2 shown in FIG. 1*a* can first be structured to form a coil string. The coil string is shown in FIG. 2. The tube 2 in this case may be structured, in particular, by a laser process, in which inductive portions 7 and contact portions 8 are realized in the tube 2. The inductive portions 7 and the contact portions 8 alternate along the tube 2.

A gap 4, which extends through a tube wall 6 and shapes the tube wall 6 to form a helix, is created in the inductive portions 7. An inductance of the inductive portions 7 is thereby realized. Following singulation of the coil string, the contact portions 8 form electrical terminals. A recess is formed in the contact portions 8 during the structuring of the tube 2, a part of the tube wall 6 being removed.

The coil string optimizes the handling of the coils in production process. Thus, a plurality of coils can be processed simultaneously, resulting in a reduced production cycle time. In addition, material can be saved by the creation of a plurality of inductive portions 7 in one tube 2.

The inductive portions 7 are integrally connected to each other by the contact portions 8 and have no unnecessary transition resistances between each other.

The different inductive portions 7 of the coil string may have differing or the same inductances. It is thus possible to create differing coils from one tube 2, each of which can be varied in inductance, and which are therefore suitable for a wide variety of applications. The inductances may be varied, for example, by the number of turns formed by means of the gap 4, or by the distance of the gaps 4 in the direction of the central axis 3 after one passage around the tube 2, which corresponds to the width of the turns. In the exemplary embodiment from FIG. 2, the gaps 4 shown are equal, and consequently the inductance of each inductive portion 7 is also equal.

Figure 3:
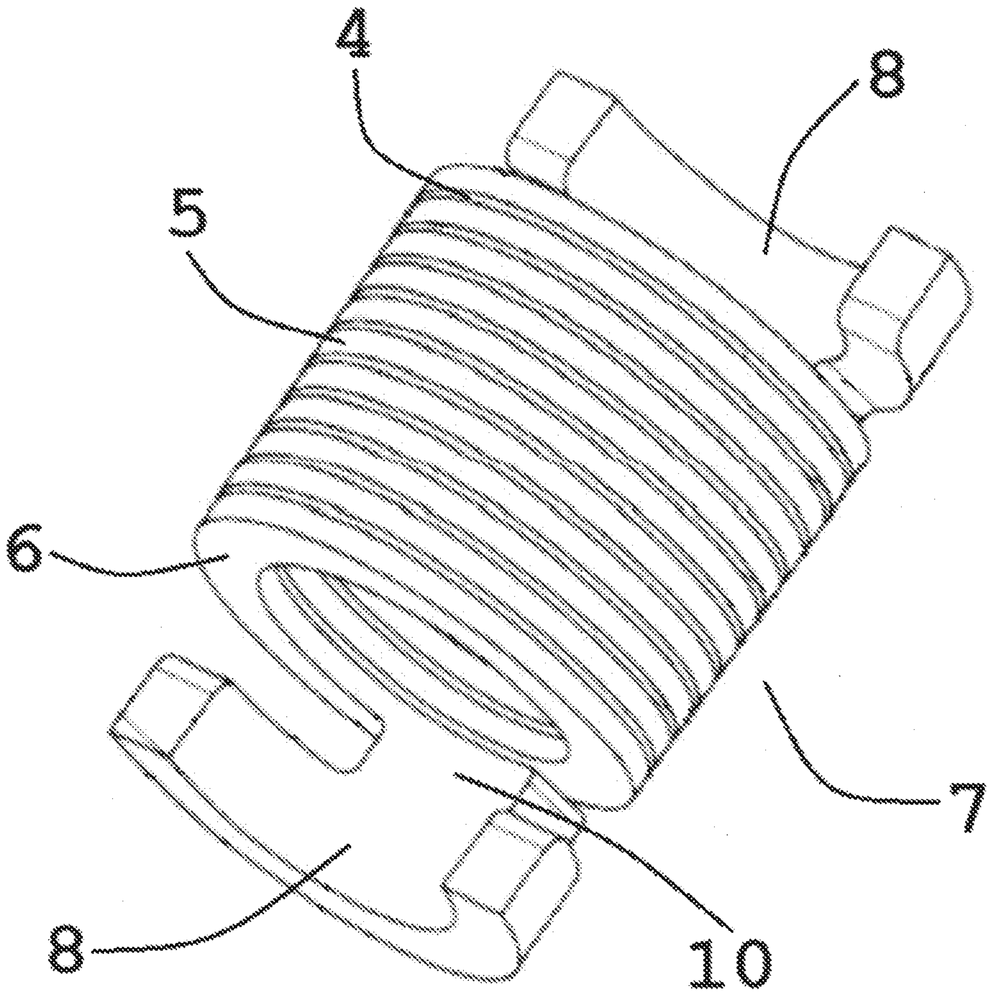
FIG. 3 shows a three-dimensional representation of an intermediate product in the production of a coil from the coil string.

FIG. 3 shows a three-dimensional representation of an intermediate product in the production of a coil from the coil string. The coil string has been singulated along separation lines running transversely with respect to the central axis 3 of the coil string.

The coil has a tube 2 composed of electrically conductive material, with a gap 4 created along a circumferential surface 5 and around the longitudinal axis 3 of the tube 2, thus forming an inductive portion 7. In an alternative embodiment, the entire tube 2 may be structured in such a manner as to provide only a single inductive portion 7 and two contact portions 8 adjoining the latter. Accordingly, the tube 2 may be structured to form the intermediate product shown in FIG. 3, in which case the tube 2 must be cut to a suitable length.

The contact portion 8 and the inductive portion 7 are connected to each other by a connecting portion 10. The contact portion 8, the connecting portion 10 and the inductive portion 7 are formed integrally and as a single piece from the structured tube wall 6. The connecting portion 10 is of sufficient width so as to be insignificant to the resistance of the coil 1.

Figure 4:
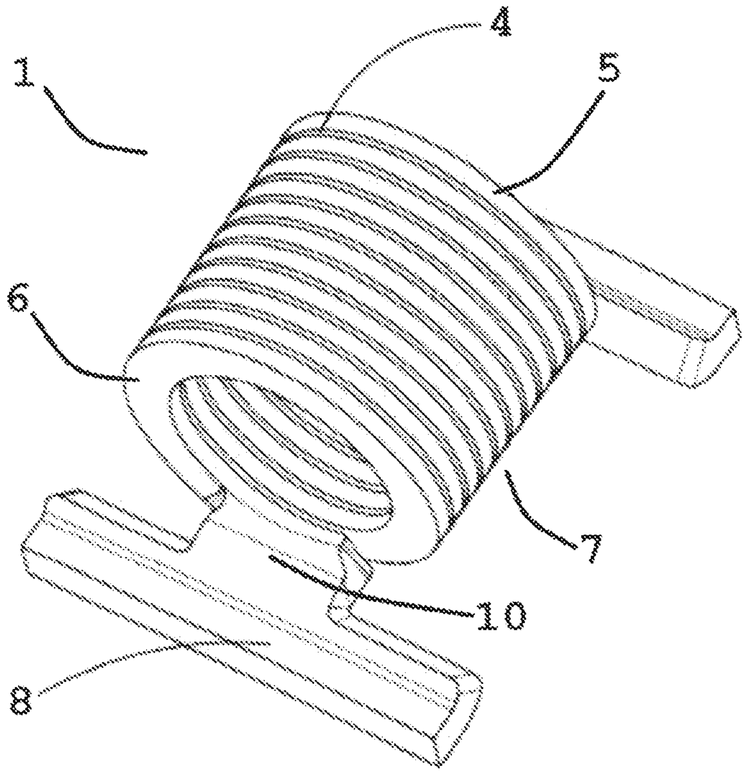
FIG. 4 shows a three-dimensional representation of a coil, the contact portions of which are open and planarized.

FIG. 4 shows the coil 1 following planarization of the contact portions. The contact portions 8 of the tube 2, which are located between the inductive portions 7, have been planarized. Planarization of the contact portions 8 creates an electrical terminal, as a flat surface, that is suitable for providing electrical contacting. The embodiment shown in FIG. 4 is suitable, for example, for contacting to the printed conductors of a printed circuit board by means of a soldering process.

However, the design of the contact portions 8 is not limited to the embodiments represented. In particular, the shape of the contact portions 8 may be adapted to a housing shape.

Figure 5:
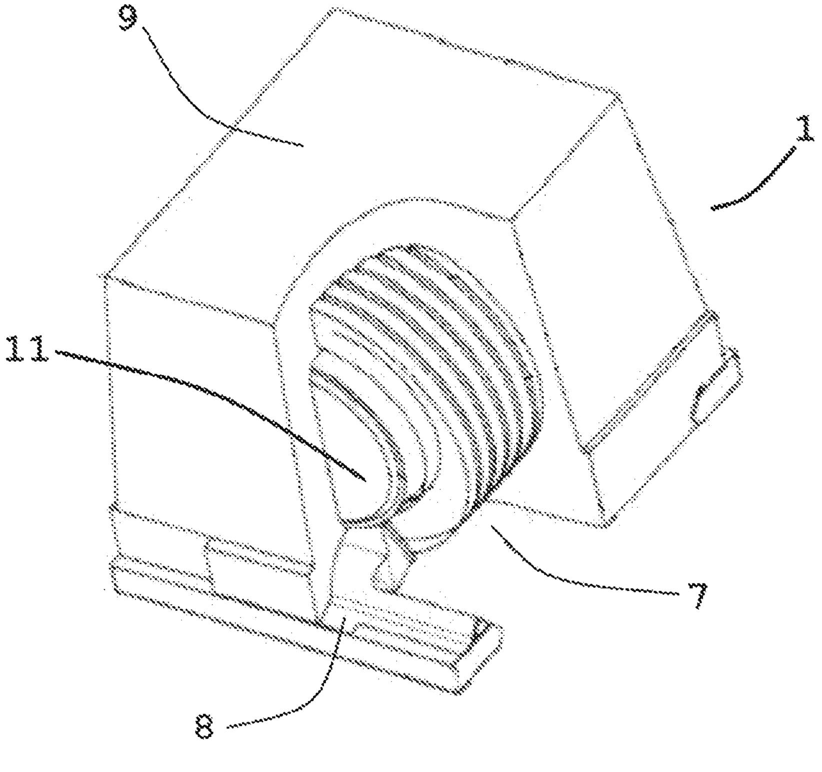
FIG. 5 shows a three-dimensional representation of a coil as in FIG. 4, but which has a magnetic core—cylinder core—and is embedded in plastic.

FIG. 5 shows the coil 1 shown in FIG. 4, which has additionally been equipped with a magnetic core 11. In addition, the coil 1 is embedded in plastic 9, and the plastic 9 may contain amounts of magnetic particles. The use of a, for example, ferromagnetic core 11 can provide a higher magnetic flux density in the coil 1 and an increase in the inductance of the coil 1.

Figure 6:
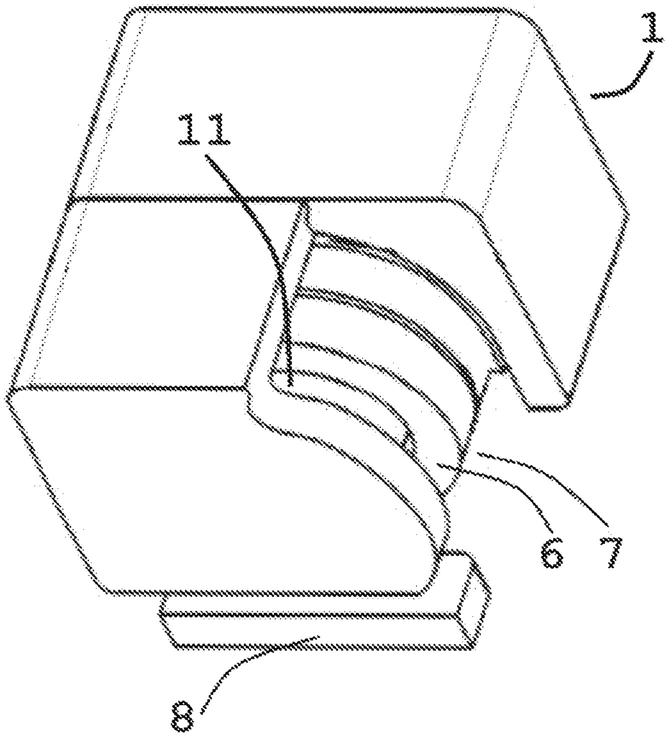
FIG. 6 shows a three-dimensional representation of a core that is arranged in a removable housing, having an integrated core—EP core.

FIG. 6 shows an alternative embodiment, in which the coil shown in FIG. 4 is connected to an EP core 11, the EP core 11 also integrally forming a housing. The EP core 11 consists of two halves which can subsequently be glued together. The EP core 11 allows the coil 1 to be electromagnetically shielded, in particular in the case of high-frequency applications, and thus increases the electromagnetic compatibility of the component.

Figure 7:
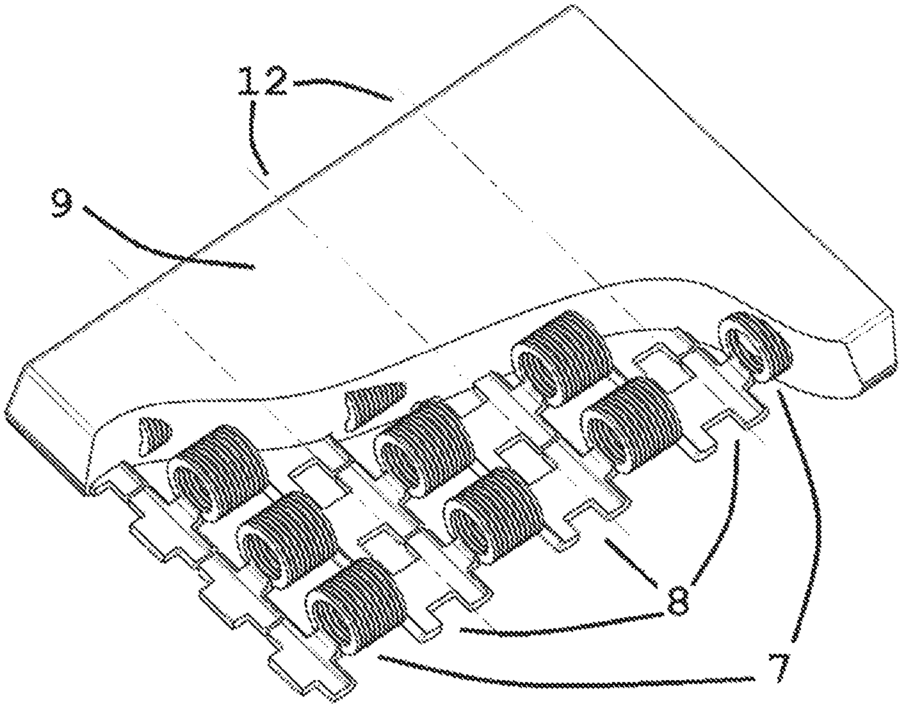
FIG. 7 shows a three-dimensional representation of a plurality of coil strings, which are embedded in plastic to form a package.

In FIG. 7, there are four coil strings embedded in plastic 9, with the central axes 3 of the coils 1 being arranged parallel to each other. Such an arrangement is also called a package. Here, the four coil strings each have four inductive portions 7 and five contact portions 8. The package shown in FIG. 7 is only an example, and more coil strings, and in particular more than 20 coil strings, having any other number of inductive portions 7 and contact portions 8 may be used. In this exemplary embodiment, the contact portions 8 have been opened by recesses and then planarized. The dashed lines indicate three possible separation lines 12 for singulation, which run transversely with respect to the central axis 3 of the coils 1 and through the contact portions 8. Also conceivable are alternative embodiments in which singulation is effected along any other number of separation lines 12. Singulation parallel to the central axis 3 of the coils 1 is also possible. If the coil 1 is singulated parallel to the central axis 3 of the tube 2, the inductive portions 7 are connected to each other in series. Embedding a plurality of coil strings at the same time, rather than individually, enables the production process to be accelerated.

Primarily, the coils 1 are protected by the plastic 9 against mechanical influences, but also against temperature influences and chemical influences. However, the plastic 9 may also be mixed with particles having magnetic properties, such as, for example, iron powder or magnetic nanoparticles. The addition of magnetic particles to the plastic enables the inductance of the coil to be increased, and also to be adjusted on the basis of the proportion of magnetic particles in the plastic.

Figure 8:
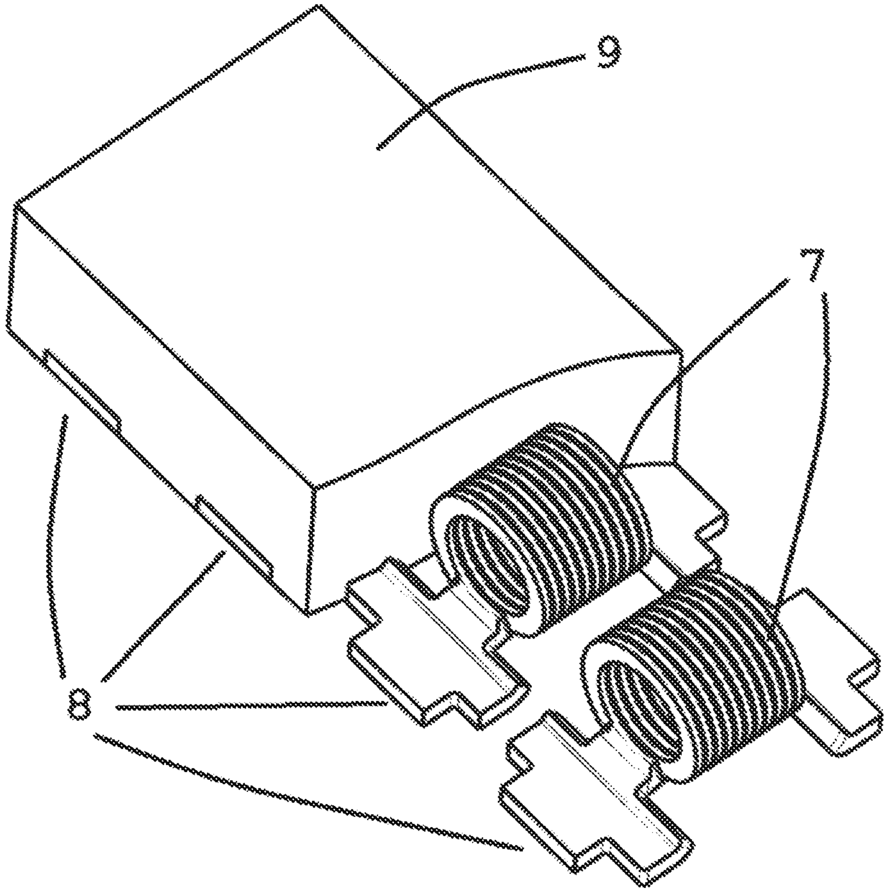
FIG. 8 shows a three-dimensional representation of a plurality of coils, which are embedded in plastic and have been singulated transversely with respect to the central axis of the coil strings.

FIG. 8 shows a module composed of four inductive portions 7, which have likewise been embedded in plastic 9 and which have been singulated from the package in a manner analogous to the dashed lines in FIG. 7. The module shown in the figure is only an example, and more coils 1, and in particular more than 20 coils 1, may be arranged in the module. The contact surfaces themselves can be contacted from below and, if necessary, from the side, and may be contacted, for example, via solder pads or printed conductors, by means of a soldering process or adhesive process. The use of a module can result in a reduction in cycle time in mounting the coils 1. By installing a module instead of individual coils 1, for example an automatic pick-and-place machine only needs to position the component once on a printed circuit board, instead of several times. Moreover, space is saved by multiple coils being arranged within a module, compared to a plurality of individual coils being arranged adjacently.

The advantage of the inductive portions 7 being arranged as in FIG. 8 is that the individual inductive portions 7 can be connected in a variable manner. The coils 1 in the module may be designed to be connected to each other in parallel, in series or not at all. In the embodiment shown in FIG. 8, each coil 1 can be contacted individually. If, on the other hand, the module is contacted to two printed conductors running perpendicular to the longitudinal axis 3, the inductive portions 7 are electrically connected in parallel to each other. If the printed conductor is meandered under the module, the inductive portions 7 are connected in series.

Figure 9:
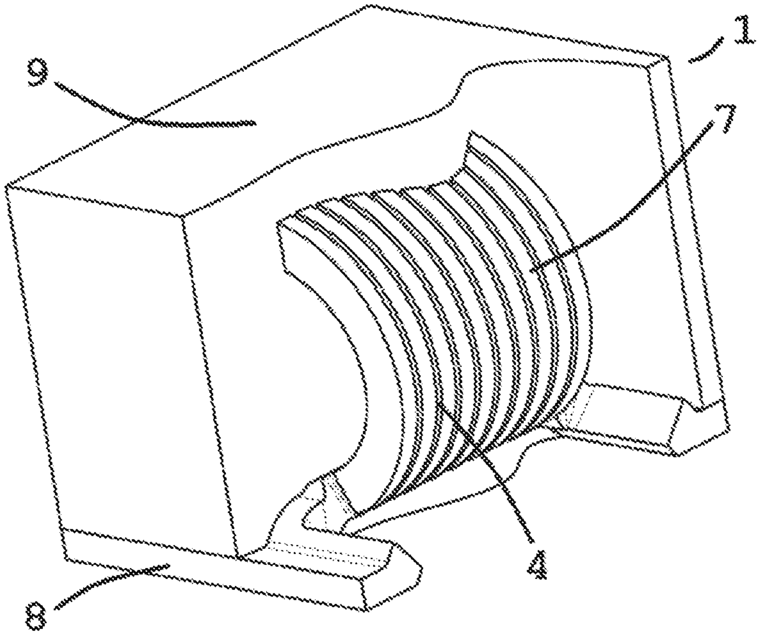
FIG. 9 shows a three-dimensional representation of a coil that has been embedded in plastic and is a single component ready for use.

FIG. 9 shows a single coil 1 that has been embedded in plastic 9. In the example shown, the coil 1 has 10 turns and planar contact portions 8. In other embodiments, however, the coil may have many more turns, and in particular even more than 20 turns. It may have been produced either by singulating the coils 1 from FIG. 8 parallel to the longitudinal axis 3 of the tube 2, or by embedding a single coil 1, as from FIG. 3, in plastic 9. Singulation of the coil 1 from a package, with the first separation parallel and subsequently transverse to the longitudinal axis of the coil, or the other way round, is also possible.

A coil 1 as shown in FIG. 9 has the advantage that it can be contacted via the planar contact portion 8, which is realized integrally with the coil 1. The integral realization of the coil 1 from the tube 2 makes it possible to dispense with additional connection techniques. For this reason, the coil 1 has a lower overall resistance, which in turn results in a low power loss. In addition, the thermal load is also reduced, especially at possible contacting points, thereby reducing the fault susceptibility of the coil.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A coil comprising:

an inductive portion in which a helix is formed by a gap in a tube wall of a tube, the tube wall being composed of an electrically conductive material;

two contact portions forming electrical terminals, each contact portion being formed from the tube wall; and two connecting portions formed from the tube wall, each connecting portion connecting one of the two contact portions to the inductive portion, wherein each of the contact portions has two arms pointing oppositely along a direction perpendicular to a longitudinal axis of the helix, wherein the arms are planar in a plane parallel to the longitudinal axis of the helix, and wherein each connecting portion is shorter in the direction perpendicular to the longitudinal axis of the helix than the respective arms along an entire length in the direction perpendicular to the longitudinal axis of the helix, allowing positioning the coil on a printed circuit board along the entire lengths of the arms.

2. The coil according to claim 1, further comprising a core.

3. The coil according to claim 1, wherein the helix is embedded in a plastic.

4. The coil according to claim 3, wherein the plastic is mixed with magnetic powder, magnetic particles or another magnetic material.

5. The coil according to claim 1, wherein the coil has an E-shaped pot (EP) core.

6. The coil according to claim 1, wherein the helix has an outer diameter of between 0.2 mm and 50 mm, inclusive.

7. The coil according to claim 1, wherein each contact portion has a flat surface forming a solderable terminal.

8. A module comprising:

at least two coils according to claim 1, wherein the two coils are arranged in a common housing.

9. A method for producing the coil according to claim 1, the method comprising:

providing the tube with the tube wall;

creating the gap in the tube wall;

shaping at least two portions in the tube wall thereby forming the two contact portions and the two connecting portions; and planarizing the contact portions to form the planar contact portions.

10. The method according to claim 9, further comprising using a laser process to create the gap and to shape the contact portions.

11. The method according to claim 9, further comprising removing a region of the tube wall thereby forming a recess in the contact portion of the tube.

12. The method according to claim 11, wherein the recess in the contact portion of the tube and the gap in the inductive portion are created jointly in a single step.

13. The method according to claim 11, further comprising planarizing a region in the contact portion of the tube wall that was not removed.

14. The method according to claim 9, wherein creating the gap comprises:

firstly creating a coil string so that a plurality of inductive portions are arranged along the tube and so that the gap is created in each inductive portion thereby forming the helix in the tube wall in a respective inductive portion, and secondly singulating the coil string between two adjacent inductive portions in each case so that a contact portion is formed that forms an electrical terminal to the two adjacent inductive portions.

15. The method according to claim 14, wherein the coil has an E-shaped pot (EP) core.

16. The method according to claim 14, further comprising creating a plurality of coil strings, and embedding the plurality of coil strings in a plastic, wherein the coil strings are arranged parallel to each other.

17. The method according to claim 16, further comprising arranging cores in the coil strings.

18. The method according to claim 16, wherein the plastic is mixed with magnetic powder, magnetic particles or another magnetic material.

19. The method according to claim 16, further comprising singulating the coil strings transversely and/or parallel with respect to a central axis of the coil strings.

20. A method for producing modules, wherein each module has at least two coils in a common housing, wherein each of the coils is the coil according to claim 1, the method comprising:

creating at least two coil strings comprising a plurality of inductive portions in each of which the gap is created that shapes the tube wall in a respective inductive portion to form the helix, a contact portion between two adjacent inductive portions in each case and a connection portion between the contact portion and the inductive portion in each case;

planarizing the contact portions to form planar contact portions;

arranging the coil strings in parallel;

embedding the coil strings in a plastic, which forms the housing; and singulating the coil strings connected by the plastic, along separation lines that run transverse to a central axis of the coil strings to form the modules, wherein the contact portion, following singulation of the coil string, forms an electrical terminal to the two adjacent inductive portions in each case.

21. A coil comprising:

an inductive portion in which a helix is formed by a gap in a tube wall of a tube, the tube wall being composed of an electrically conductive material; and two contact portions forming electrical terminals, each contact portion being formed from the tube wall, wherein each contact portion has two arms pointing in opposite directions, wherein the arms are configured for positioning the coil on a printed circuit board with an axis of the helix parallel to a main plane of the printed circuit board, wherein the helix is embedded in a plastic, wherein the coil is connectable to the printed circuit board at a bottom side of each of the arms, the bottom side being configured to point to the printed circuit board, wherein the coil is connectable to the printed circuit board at a lateral side of each of the contact portions, the lateral side being a side adjacent to the bottom side, and wherein the lateral side of the coil is entirely covered by the plastic except from the lateral sides of the contact portions.

22. The coil according to claim 21, wherein the contact portions are solderable on a conducting path on the printed circuit board.

23. An assembly comprising:

the coil according to claim 21; and the printed circuit board, wherein the coil is mounted on the printed circuit board such that the arms extend in a direction parallel to the main plane of the printed circuit board.

24. An assembly comprising:

the coil according to claim 1; and the printed circuit board, wherein the coil is mounted on the printed circuit board such that the arms extend in a direction parallel to a main plane of the printed circuit board.

25. The assembly of claim 24, wherein the coil is soldered to the printed circuit board.

26. The module of claim 8, wherein the helices of the two coils are arranged along a common helix axis.

27. The module of claim 26, wherein the coils are electrically connected in series to each other.

* * * * *